United States Patent
Doan et al.

(10) Patent No.: US 9,505,325 B2
(45) Date of Patent: Nov. 29, 2016

(54) ENERGY ABSORBING COLLAPSIBLE ARMREST WITH TUNABLE STIFFENING FEATURE

(71) Applicant: Ford Global Technologies, LLC, Dearborn, MI (US)

(72) Inventors: Linh Doan, Belleville, MI (US); Kenneth S. Laird, Canton, MI (US); Krishnakanth E. Aekbote, Farmington Hills, MI (US); Yudong Zhou, Troy, MI (US); Nitesh Chandrakant Jadhav, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/567,536

(22) Filed: Dec. 11, 2014

(65) Prior Publication Data

US 2016/0167550 A1   Jun. 16, 2016

(51) Int. Cl.
*B60N 2/46* (2006.01)
*B60N 2/427* (2006.01)

(52) U.S. Cl.
CPC ............... *B60N 2/46* (2013.01); *B60N 2/427* (2013.01)

(58) Field of Classification Search
CPC ............................... B60N 2/46; B60N 2/427
See application file for complete search history.

(56) References Cited

U.S. PATENT DOCUMENTS

| | | |
|---|---|---|
| 3,362,749 A | 1/1968 | Clement |
| 3,387,881 A | 6/1968 | Stepanek et al. |
| 4,783,114 A | 11/1988 | Welch |
| 5,181,759 A | 1/1993 | Doolittle |
| 5,527,084 A | 6/1996 | Scherf |
| 5,803,415 A | 9/1998 | Konishi et al. |
| 5,939,165 A | 8/1999 | Oike et al. |
| 6,475,576 B1 | 11/2002 | Ashtiani et al. |
| 6,893,077 B1 | 5/2005 | DeJongh |
| 7,070,221 B2 | 7/2006 | Cowelchuk et al. |
| 7,104,590 B2 | 9/2006 | Dooley et al. |
| 7,121,611 B2 | 10/2006 | Hirotani et al. |
| 7,247,382 B2 | 7/2007 | Gardner, Jr. |
| 7,387,326 B2 | 6/2008 | Osada |
| 7,503,621 B2 | 3/2009 | Mani |
| 7,658,426 B2 | 2/2010 | Hayakawa et al. |
| 7,681,939 B2 | 3/2010 | Augustyn |
| 7,726,726 B2 | 6/2010 | Cavallin et al. |
| 7,731,268 B2 | 6/2010 | Motowski et al. |
| 7,794,009 B2 | 9/2010 | Pinkerton et al. |
| 7,794,010 B2 | 9/2010 | Saida et al. |
| 7,828,388 B2 | 11/2010 | Thomas |
| 7,871,119 B2 | 1/2011 | Schoemann et al. |
| 8,157,309 B2 | 4/2012 | Ishikawa |
| 8,172,311 B2 | 5/2012 | Hughes, Jr. et al. |
| 8,424,954 B2 | 4/2013 | Hall et al. |
| 2012/0231215 A1 | 9/2012 | Hayashi |

*Primary Examiner* — Glenn Dayoan
*Assistant Examiner* — Melissa A Black
(74) *Attorney, Agent, or Firm* — Vichit Chea; Price Heneveld LLP (57) ABSTRACT

A vehicular armrest assembly includes a laterally collapsible substrate having a gap defined between inner and outer substrate portions. A tunable stiffening feature is disposed on the collapsible substrate and has an aperture positioned over the gap, and engagement tabs that engage the inner and outer substrate portions. The stiffening feature provides lateral support to the collapsible substrate to selectively allow the inner and outer substrate portions to deflect toward each other after a predetermined lateral load is placed on the collapsible substrate and an elastic bed disposed on the tunable stiffening feature and covering the aperture. The elastic bed vertically supports a cover member at the aperture and the lateral support provided to the collapsible substrate is solely provided by the stiffening feature.

20 Claims, 6 Drawing Sheets

ENERGY ABSORBING COLLAPSIBLE ARMREST WITH TUNABLE STIFFENING FEATURE

FIELD OF THE INVENTION

The present invention generally relates to vehicle armrests, and more specifically a vehicle armrest where at least a portion of the vehicle support is provided by a substantially elastic energy absorption member and a tunable feature incorporated therein.

BACKGROUND OF THE INVENTION

Vehicles contain various styles of armrests within door assemblies and also within side panels, where no door is present. Various armrests can include additional cushioning and handles, as well as other features such as storage compartments and cup holders. Because armrests project into the cabin space of the vehicle, they can present a potential hazard during a side impact collision placed upon the vehicle. In such an impact, the armrest can be forced further into the cabin area as a result of the impact.

SUMMARY OF THE INVENTION

According to one aspect of the present invention, a vehicular armrest assembly includes a laterally collapsible substrate having a gap defined between inner and outer substrate portions. A tunable stiffening feature is disposed on the collapsible substrate and has an aperture positioned over the gap, and engagement tabs that engage the inner and outer substrate portions. The stiffening feature provides lateral support to the collapsible substrate to selectively allow the inner and outer substrate portions to deflect toward each other after a predetermined lateral load is placed on the collapsible substrate. An elastic bed is disposed on the tunable stiffening feature and covering the aperture. The elastic bed vertically supports a cover member at the aperture. The tunable lateral support provided to the collapsible substrate is provided by the stiffening feature.

According to another aspect of the present invention, a vehicular armrest includes an armrest substrate having inner and outer substrate portions defining a gap. An interior reinforcement is disposed on the armrest substrate and has a tunable lateral stiffener defining an aperture positioned above the gap and a vertically-supporting elastic bed. The lateral stiffener provides a predetermined lateral support between the inner and outer substrate portions. A cover is positioned over and is vertically supported by the elastic bed proximate the aperture.

According to another aspect of the present invention, a vehicular armrest includes a tunable stiffening feature spanning a gap defined between opposing armrest substrates and setting the lateral positions of the opposing armrest substrates. The tunable stiffening feature has an aperture disposed within the gap and an elastic cover extending over the aperture and providing vertical support to an armrest cover proximate the aperture. The elastic cover is free of lateral resistance to the movement of the opposing armrest substrates.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
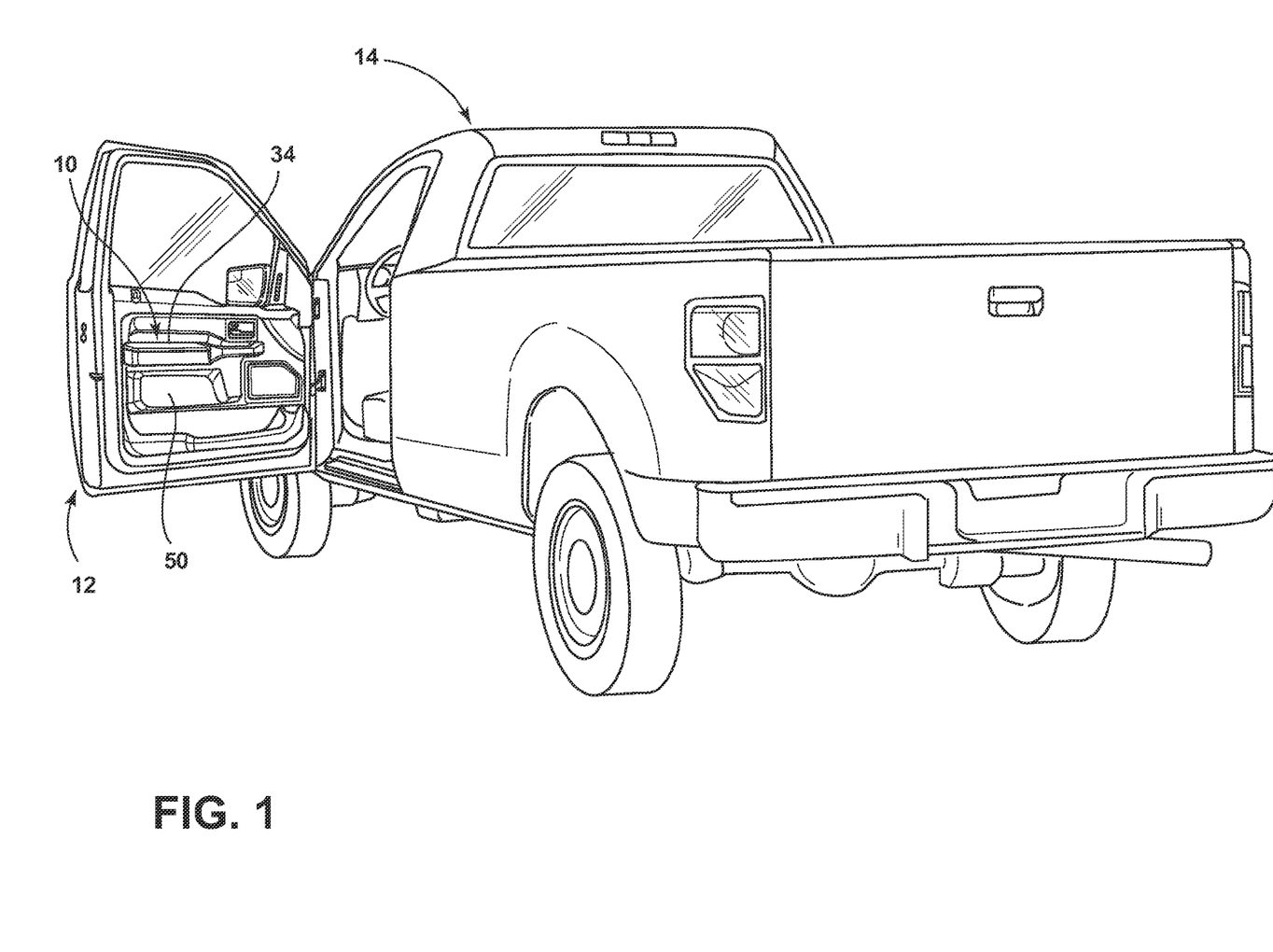
FIG. 1 is a rear side perspective view of a vehicle with a door in the open position and having an embodiment of the tunable energy absorbing collapsible armrest installed therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a tunable energy absorbing collapsible armrest assembly disposed within a door 12 of a vehicle 14. The tunable energy absorbing collapsible armrest 10 includes a laterally collapsible substrate 16 having a gap 18 defined between inner and outer substrate portions 20, 22. A tunable stiffening feature 24 is disposed on the collapsible substrate 16 and includes an aperture 26 positioned over the gap 18. Various engagement tabs 28 of the tunable stiffening feature 24 are configured to engage the inner and outer substrate portions 20, 22. The stiffening feature 24 is further configured to provide lateral support to the collapsible substrate 16 to selectively allow the inner and outer substrate portions 20, 22 to deflect toward each other after a predetermined lateral load 30 (shown in FIG. 6) is placed on the collapsible substrate 16. An elastic bed 32 is disposed on the tunable stiffening feature 24 and is positioned over the aperture 26. The elastic bed 32 vertically supports a cover member 34 proximate the aperture 26. Accordingly, lateral support that is provided to the collapsible substrate 16 is provided by the tunable stiffening feature 24 while vertical support provided to the occupant's arm at the apertures 26 is provided by the elastic bed 32.

Referring again to the embodiment illustrated in FIGS. 1-4, the tunable energy absorbing collapsible armrest 10 is installed within the door 12 of a vehicle 14 proximate the location of the occupant's elbow and arm to provide vertical support to the occupant's arm while within the vehicle 14. It is contemplated that the tunable energy absorbing collapsible armrest 10 can be disposed at the interior door panels 50 of a vehicle 14 to provide arm support for occupants in seating locations that do not necessarily have a door 12 adjacent thereto. Such locations can include, but are not limited to, a rear seat in a two-door vehicle, a third-row seat in a four-door vehicle, a center console, and other similar locations.

Figure 2:
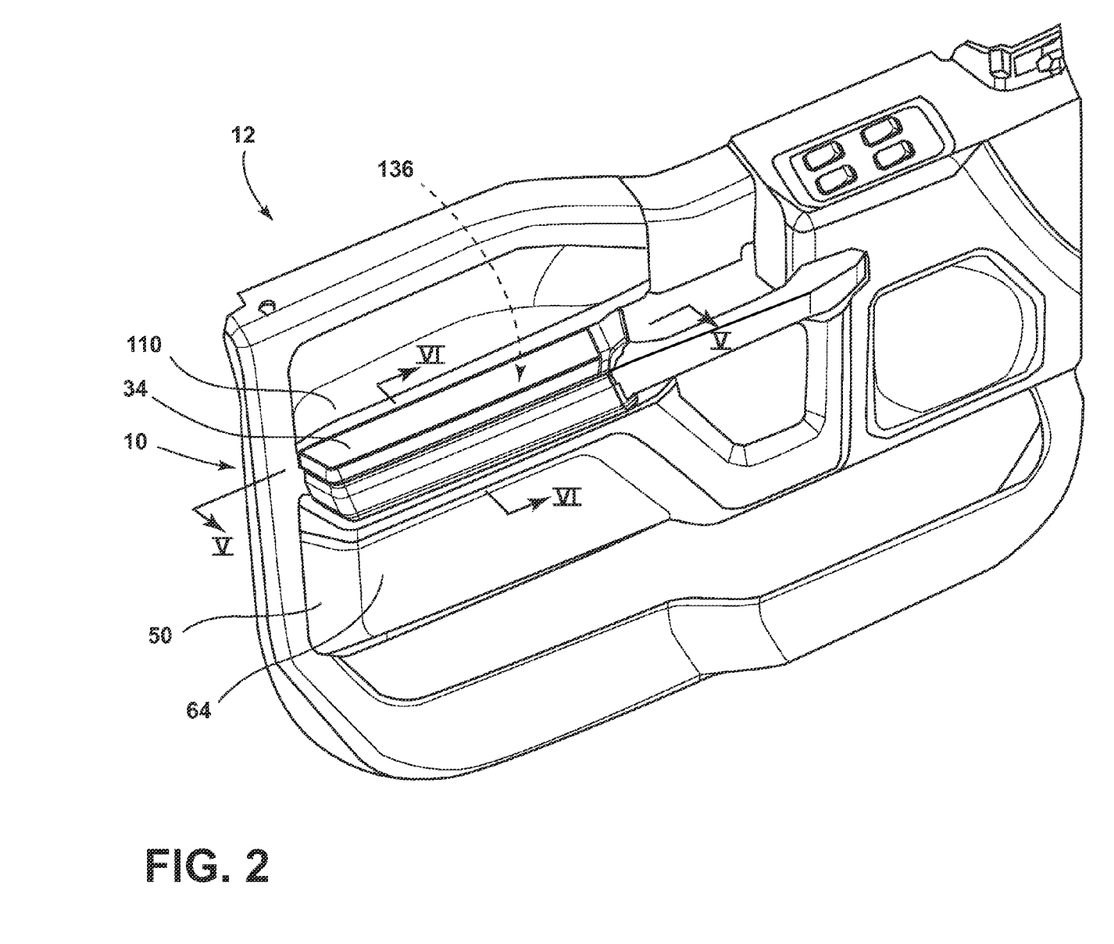
FIG. 2 is an enlarged top perspective view of the vehicle door of FIG. 1 showing the vehicle armrest incorporating the tunable energy absorbing collapsible armrest.
Figure 3:
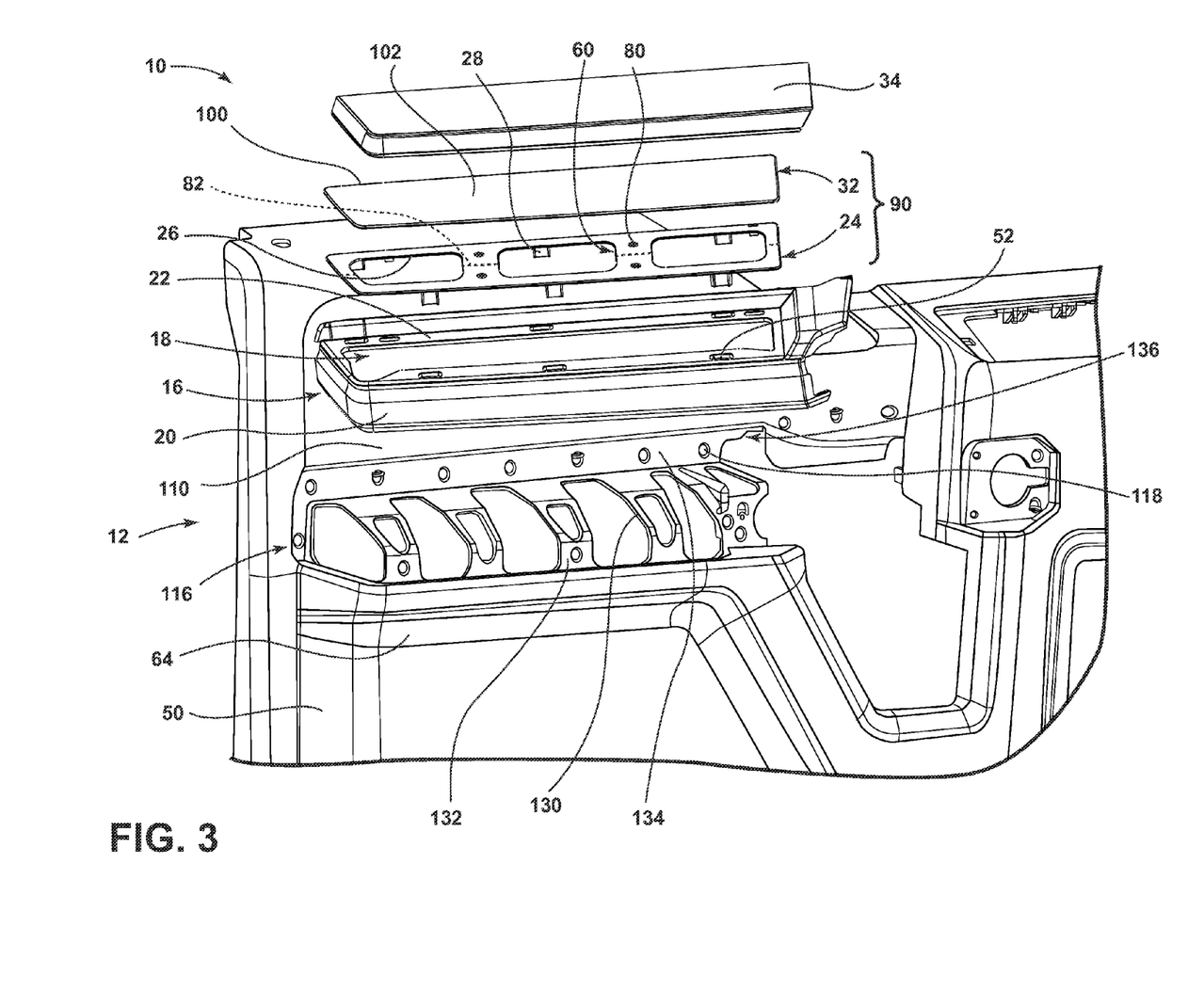
FIG. 3 is an enlarged and exploded perspective view of a vehicle door incorporating an alternate embodiment of the tunable energy absorbing collapsible armrest.
Figure 4:
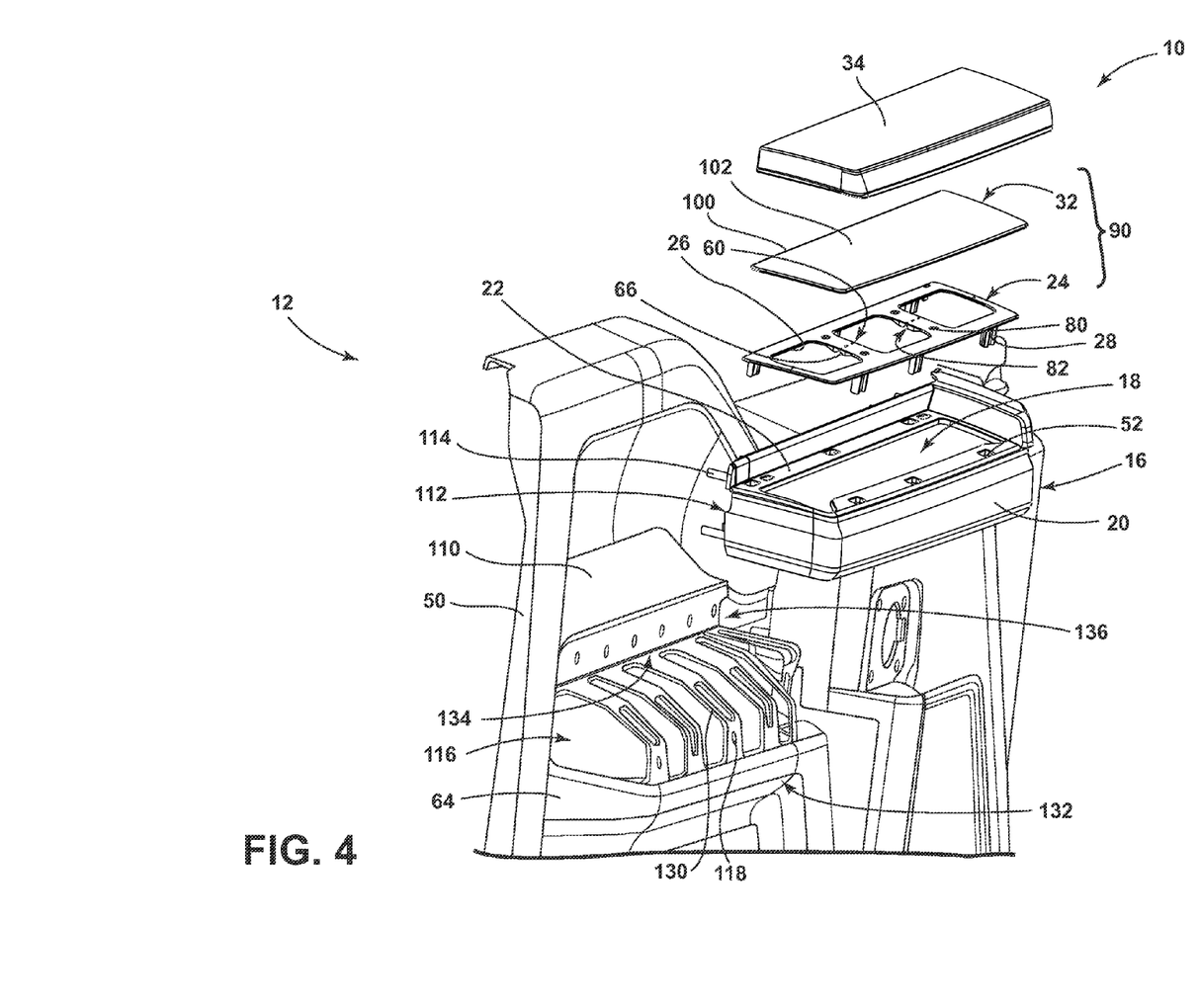
FIG. 4 is an enlarged and exploded rear perspective view of the tunable energy absorbing collapsible armrest of FIG. 3.
Figure 5:
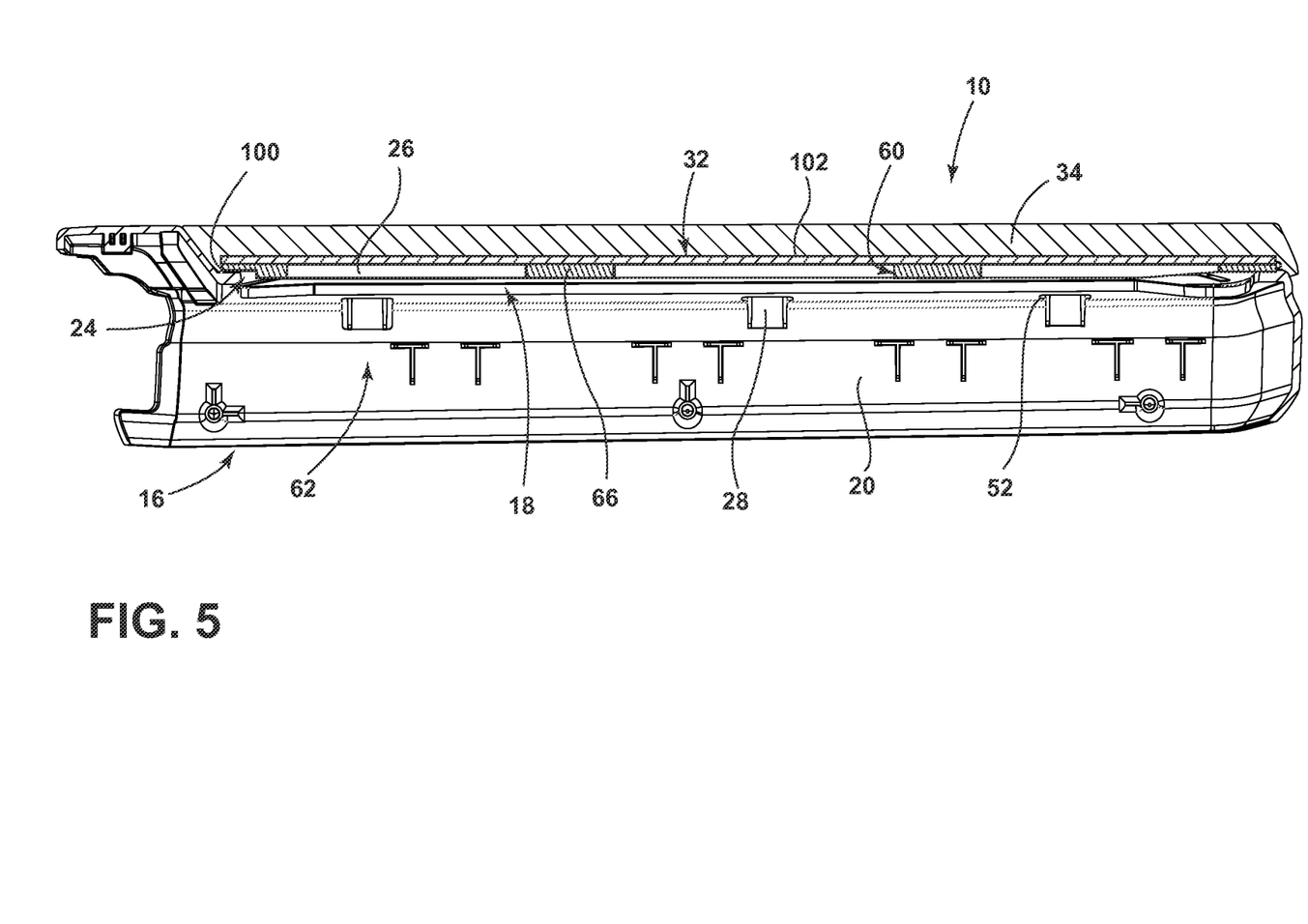
FIG. 5 is a cross-sectional view of the tunable energy absorbing collapsible armrest of FIG. 2 taken along line V-V.
Figure 6:
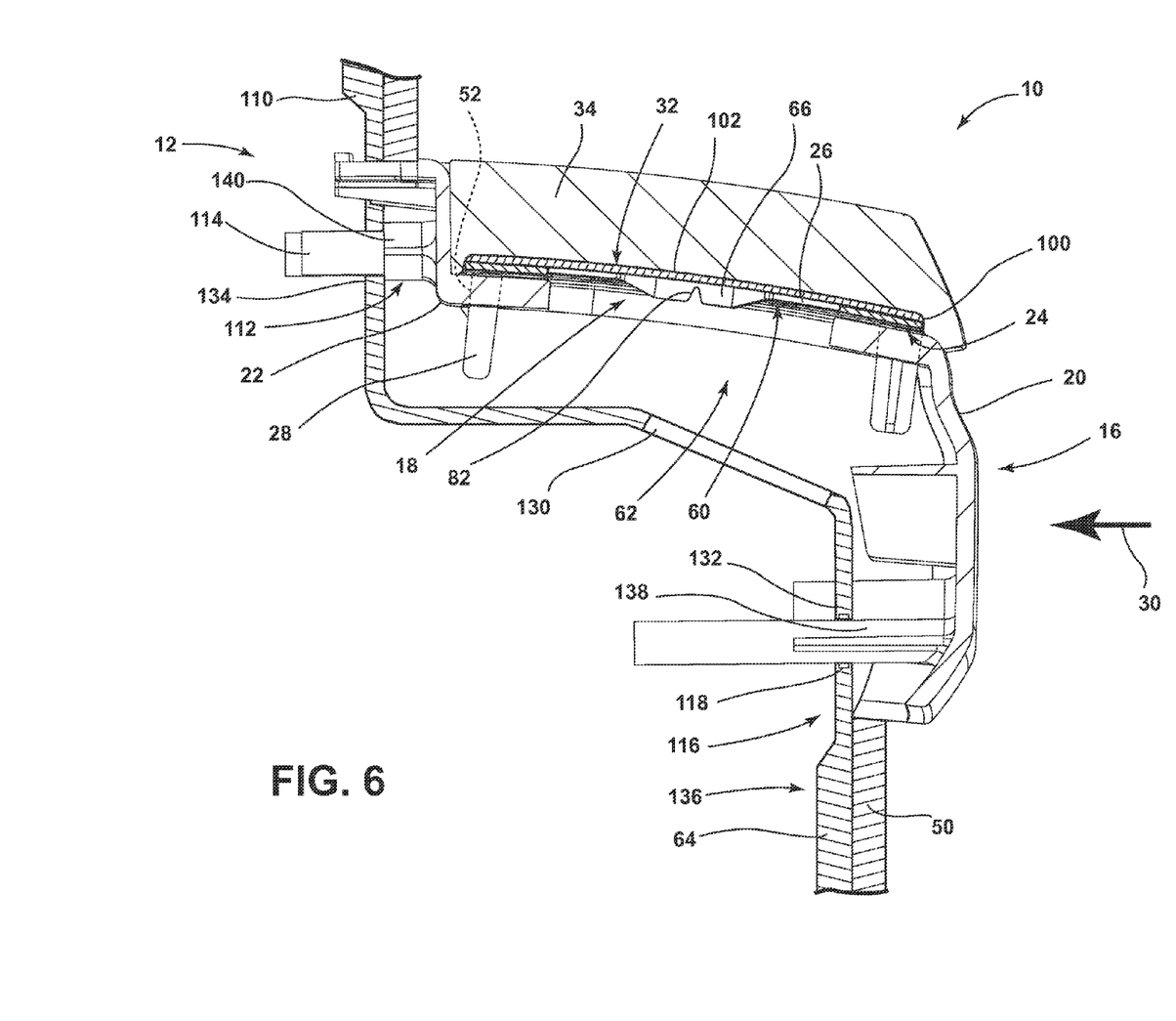
FIG. 6 is a cross-sectional view of the tunable energy absorbing collapsible armrest of FIG. 2 taken along line VI-VI.

Referring now to the embodiment illustrated in FIGS. 1, 2 and 6, it is contemplated that the inner and outer substrate portions 20, 22 can include tab receptacles 52 for receiving the tabs of the tunable stiffening feature 24. In this manner, the tunable stiffening feature 24 can be inserted into portions of the inner and outer substrate portions 20, 22, such that the tunable stiffening feature 24 can assist in positioning the inner and outer substrate portions 20, 22 relative to one another as various lateral loads 30 are exerted upon the energy absorbing collapsible armrest 10. It is also contemplated that the tunable stiffening feature 24 can be attached to the collapsible substrate by various connections mechanisms that can include, but are not limited to, fasteners, staples, welding, adhesives, combinations thereof, and other similar connection mechanisms. According to various embodiments, the tunable stiffening feature 24 can be overmolded onto the collapsible substrate 16, such that the tunable stiffening feature 24 is substantially integral with the inner and outer substrate portions 20, 22. In such an embodiment, the tunable stiffening feature 24 may not necessarily include the engagement tabs 28 that extend downward from the tunable stiffening feature 24. Rather, in embodiments having the overmolded tunable stiffening feature 24, the tunable stiffening feature 24 is adapted to substantially engage the inner and outer substrate portions 20, 22 such that the tunable stiffening feature 24 is substantially integral with the collapsible substrate 16 and, in turn, the inner and outer substrate portions 20, 22.

Referring now to FIGS. 3-6, the tunable stiffening feature 24 can include at least one spanning support 60 that forms the aperture or plurality of apertures 26 defined within the tunable stiffening feature 24. It is also contemplated that the tunable stiffening feature 24 can include a plurality of spanning supports 60 that define several apertures 26 within the tunable stiffening feature 24. In the various embodiments, it is contemplated that the various apertures 26 of the tunable stiffening feature 24 are disposed over the gap 18 defined between the inner and outer substrate portions 20, 22 of the laterally collapsible substrate 16. The combination of the gap 18 and the apertures 26 creates a substantially continuous void 62 extending from a lower portion 64 of the interior door panel 50 up through the collapsible substrate 16 and the tunable stiffening feature 24 and to the elastic bed 32 of the tunable energy absorbing collapsible armrest 10. In this manner, the spanning supports 60 can provide lateral stiffening functionality to the laterally collapsible substrate 16 to buttress the inner and outer substrate portions 20, 22 against various lateral loads 30 that are placed upon the collapsible substrate 16. It is also contemplated that each spanning support 60 of the tunable stiffening feature 24 can include a structural rib 66 disposed adjacent at least one of the apertures 26 defined within the tunable stiffening feature 24. The structural ribs 66 are adapted to add greater structural strength against deflection caused by various lateral loads 30 exerted upon the tunable stiffening feature 24.

Referring again to FIGS. 3-6, during the design of the armrest 10, the tunable stiffening feature 24 is disposed upon a base or a stock version of the laterally collapsible substrate 16. In this manner, inner and outer substrate portions 20, 22 can be generally designed to be disposed within a variety of different vehicles having various functionalities. In order to design the armrest 10 to withstand a predetermined lateral load 30, based upon the model, use, function and type of vehicle being designed, the tunable stiffening feature 24 can be tuned to provide additional lateral support between the inner and outer substrate portions 20, 22 depending upon these and other various factors and tolerances used to design the armrest 10. It is contemplated that in refining the design of the tunable stiffening feature 24 to provide greater or lesser amounts of lateral support, the material thickness of the tunable stiffening feature 24 can be increased or decreased to provide greater or lesser amounts of support to buttress the inner and outer substrate portions 20, 22 at predetermined positions relative to one another. It is also contemplated that the tunable stiffening feature 24 can be tuned by increasing or decreasing the size of the structural ribs 66 and/or the apertures 26 defined within the tunable stiffening feature 24 and that are disposed over the gap 18 defined between the inner and outer substrate portions 20, 22. By increasing or decreasing the size of the structural ribs 66 and/or the apertures 26 defined within the tunable stiffening feature 24, it is contemplated that the width, thickness, and/or general cross-sectional size of the spanning supports 60 can also be modified to adjust the size of the apertures 26 defined within the tunable stiffening feature 24.

Referring again to FIGS. 3-6, by allowing the tunable stiffening feature 24 to be modified or tuned to provide varying degrees of lateral support to the inner and outer substrate portions 20, 22, the base or stock version of the laterally collapsible substrate 16 having the inner and outer substrate portions 20, 22 can be manufactured for any number of vehicles. As each of the vehicles 14 are being designed, the various loads and tolerances designed to be experienced by the vehicle 14 are determined and the predetermined lateral load 30 of the particular laterally collapsible substrate 16 for an armrest 10 is determined. Designers of the vehicle 14 can use the predetermined lateral load 30 to design the various characteristics of the tunable stiffening feature 24, as described above. The designer can also tune the tunable stiffening feature 24 through some other method, which can include, but is not limited to, changing the material of the tunable stiffening feature 24, adding various subapertures 80 or buckling features 82 within portions of the tunable stiffening feature 24, combinations of these methods, and other similar features. In embodiments where subapertures 80 are used to tune the tunable stiffening feature 24, the subapertures 80 can be used to provide fine adjustment to the tunable stiffening feature 24 to arrive at a substantially precise predetermined lateral load 30 for the laterally collapsible substrate 16.

Referring again to FIGS. 3-6, it is contemplated that the armrest 10 can include an interior reinforcement 90 that is disposed on the laterally collapsible substrate 16, where the interior reinforcement 90 includes the tunable stiffening feature 24, such as a tunable lateral stiffener that defines the aperture or apertures 26 positioned above the gap 18. The internal reinforcement can also include the vertically-supporting elastic bed 32, where the tunable stiffening feature 24 provides the predetermined lateral support between the inner and outer armrest substrate portions 20, 22 and the vertically-supporting elastic bed 32 provides substantially all of the vertical support for the armrest 10 proximate each of the apertures 26 of the tunable stiffening feature 24. It is contemplated that the energy absorbing collapsible armrest 10 can also include a cover member 34 that is positioned over and is vertically supported by the elastic bed 32 proximate each of the apertures. In the various embodiments, it is contemplated that the interior reinforcement 90 made up of the tunable stiffening feature 24 and the elastic bed 32 can be integrally formed portions of the interior reinforcement 90 such that the interior reinforcement 90 defines a unitary member.

According to various embodiments, the armrest cover for the armrest 10 can include the cover member 34 that extends over various portions of the armrest 10 and can be made of various materials that can include, but are not limited to fabric, vinyl, leather, plastic, rubber, combinations thereof, and other similar materials. In addition, the cover member 34 can include an additional cushioning member such as foam, air bladders, fluid-filled bladders, memory-foam, and other various cushioning members that can be used in armrests 10 to provide additional cushioning support to the occupant's arm.

Referring again to FIGS. 3-6, it is contemplated that the elastic bed 32 can be configured as an elastic cover that extends over the various apertures 26 and subapertures 80 of the tunable stiffening feature 24 in order to provide vertical support to the cover member 34 disposed proximate each of the apertures 26 and subapertures 80. It is contemplated that the elastic bed 32 is substantially free of resistance as to any lateral movement between the opposing inner and outer substrate portions 20, 22. According to various embodiments, the elastic bed 32 can be made of various materials that can include, but are not limited to, polypropylene, unfilled polypropylene, various other polymers, rubber, plastic, vinyl, wire mesh, fabric, structural tape, ribbon, and other various elastic or plastic members that can provide vertical support proximate the apertures 26 defined within the tunable stiffening feature 24.

The elastic bed 32 is configured as a substantially planar member and a substantially thin member that extends over the tunable stiffening feature 24 to provide vertical support at the apertures 26 and subapertures 80 defined within the tunable stiffening feature 24. Accordingly, portions of the elastic bed 32 proximate the apertures 26 are permitted to deflect within the various apertures 26 defined within a tunable stiffening feature 24 to provide a cushioning functionality of the occupant's arm during use of the vehicle 14. It is also contemplated that the tunable stiffening feature 24 can be afforded a minimal amount of deflection at the various spanning supports 60 of the tunable stiffening feature 24 to provide greater flexibility to the elastic bed 32 of the energy absorbing collapsible armrest 10. Accordingly, the combination of the elastic bed 32 and the tunable stiffening feature 24 can cooperatively provide substantially high vertical load requirements through the enhanced stiffening functionality provided by the tunable stiffening feature 24. Additionally, along with the high vertical load requirements provided by the elastic bed 32 and the tunable stiffening feature 24, the amount of comfort provided to the occupant is not sacrificed due to the addition of the high vertical load bearing system described herein.

According to the various embodiments, the elastic bed 32 can be configured to be similar to a "trampoline" type structure that is configured to return to its original shape when the outer boundaries 100 of the elastic bed 32 are fixed to the tunable stiffening feature 24 and a vertical load is placed upon a central portion 102 of the elastic bed 32. Conversely, when compression-type forces, such as lateral loads 30, are placed upon the outer edges of the elastic bed 32, the elastic bed 32 provides little resistance and easily wrinkles, folds, or otherwise deflects in response to the lateral load 30 exerted thereon.

Referring again to FIGS. 3-6, it is contemplated that the elastic bed 32 and the tunable stiffening feature 24 cooperate to simultaneously provide a laterally resisting force, provided by the tunable stiffening feature 24, and also provide a vertical cushioning for the occupant's arm, provided by the elastic bed 32. In this manner, the tunable stiffening feature 24 and the elastic bed 32 cooperate to provide safety and cushioning functionality to the armrest 10 under varying typical use and atypical situations such as impact or collision conditions. In providing the lateral loading, the tunable stiffening feature 24, as discussed above, can be tuned to provide sufficient support to resist the predetermined lateral load 30 exerted upon the armrest 10. The elastic bed 32 is configured to provide little to no resistance in opposition to the predetermined lateral load 30. In turn, the elastic bed 32 provides little to no additional lateral support to the tunable stiffening feature 24. Accordingly, the tunable stiffening feature 24 can be tuned to substantial precision to provide the desired amount of lateral support for the armrest 10. In this manner, the armrest 10 is permitted to crumple or otherwise deflect in an impact condition such that the laterally collapsible substrate 16 will move and the inner and outer substrate portions 20, 22 will deflect toward one another. This deflection is permitted to occur under various conditions where the armrest 10 may engage the occupant of the vehicle 14, such as during an impact condition. While the tunable stiffening feature 24 provides this lateral support, the elastic bed 32 that is disposed over the apertures 26 of the tunable stiffening feature 24 provides a "trampoline-type" cushioning to the occupant's arm during normal operation of the vehicle 14. In this manner, the combination of the tunable stiffening feature 24 and the elastic bed 32 are allowed to provide substantial comfort as well as substantially precise resistance to a predetermined lateral load 30.

Referring again to FIGS. 1, 2, 4 and 6, the inner substrate portion 20 can be attached to a lower portion 64 of the door frame 136, and the outer substrate portion 22 can be attached to an upper portion 110 of the door frame 136. Accordingly, the opposing inner and outer armrest substrate portions 20, 22 can be attached to the frame 136 of the vehicle 14, or the interior door panel 50 of the vehicle 14, by an attachment portion 112 that is defined within the outer armrest substrate portion 22 of the laterally collapsible substrate 16. It is contemplated that the attachment portion 112 of the outer substrate portion 22 can include a plurality of protrusions 114 that are received by an armrest receptacle 116 defined within the vehicle door 12, either in the frame 136 of the door 12 or the interior door panel 50, or both. In this manner, the laterally collapsible substrate 16 can be disposed within the structure of the door 12 of the vehicle 14 simply by sliding each of the protrusions 114 of the attachment portion 112 of the outer substrate portion 22 into the armrest receptacle 116 defined within the structure of the door 12. It is contemplated that the frame 136 of the door 12 can include retaining features 118 that cooperate with the armrest protrusions 114 to define a mating interference fit between the laterally collapsible substrate 16 and the structure of the door 12. Due to the interchangeability of the laterally collapsible substrate 16 of the armrest 10, in the form of a base or stock version of the collapsible armrest substrate 16, it is contemplated that the armrest receptacle 116 defined within the frame 136 of door 12 can also be substantially predetermined and used across several vehicle types and trims. Additionally, due to the convenient engagement between the protrusions 114 of the attachment portion 112 of the laterally collapsible substrate 16 and the armrest receptacle 116 of the frame 136 of the door 12, the entire armrest 10 can be manufactured at a separate location for the remainder of the vehicle 14. The armrest 10 can be delivered to the assembly site for the vehicle 14 and can be installed within the vehicle door 12 as an entire and substantially complete structure within the frame 136 or panel of the vehicle door 12.

Referring again to FIGS. 3 and 4, it is contemplated that the frame 136 or panel of the vehicle door 12 can include various crumple portions 130 that extend between inner and outer regions 132, 134 of the vehicle frame 136. It is further contemplated that the attachment portion 112 of the armrest 10 can be separated into inner and outer attachment portions 138, 140, wherein an inner attachment portion 138 couples to one side of the crumple portions 130 and the outer attachment portion 140 attaches to the opposing side of the crumple portions 130. In this manner, the crumple portions 130 of the frame 136 of the door 12 can be adapted to cooperate with the tunable stiffening feature 24 to provide a predetermined level of lateral structural support to the armrest 10. Additionally, and as discussed above, the tunable stiffening feature 24 can be used to fine-tune the structural support provided to the armrest 10 by supplementing the load-resisting functionality of the crumple portions 130 of the frame 136.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An armrest assembly for a vehicle comprising:
   a laterally collapsible substrate having a gap defined between inner and outer substrate portions;
   a tunable stiffening feature disposed on a top of the collapsible substrate and having an aperture positioned over the gap, and engagement tabs that vertically engage the inner and outer substrate portions at respective tab receptacles, wherein the stiffening feature provides tunable lateral support to the collapsible substrate to selectively allow the inner and outer substrate portions to deflect toward each other after a predetermined lateral load is placed on the collapsible substrate; and
   a planar elastic bed disposed on the tunable stiffening feature and covering the aperture, the planar elastic bed vertically supporting a cover member at the aperture, wherein the tunable lateral support provided to the collapsible substrate is provided by the stiffening feature.

2. The armrest assembly of claim 1, wherein inner and outer substrate portions include tab receptacles for receiving the tabs.

3. The armrest assembly of claim 1, wherein the elastic bed is made of unfilled polypropylene.

4. The armrest assembly of claim 1, wherein the stiffening feature is overmolded onto the collapsible substrate.

5. The armrest assembly of claim 1, wherein the stiffening feature is tuned by modifying material thickness of the stiffening feature.

6. The armrest assembly of claim 5, wherein the stiffening feature includes a spanning support that defines a plurality of apertures.

7. The armrest assembly of claim 5, wherein the stiffening feature includes a plurality of spanning supports defining a plurality of apertures, wherein each spanning support includes a structural rib disposed adjacent at least one of the plurality of apertures, and wherein the structural rib includes a notch that at least partially defines a buckling feature of the stiffening feature.

8. A vehicle armrest comprising:
   an armrest substrate having inner and outer substrate portions defining a gap;
   an interior reinforcement disposed over the armrest substrate and having a tunable lateral stiffener defining an aperture positioned above the gap and a vertically-supporting elastic bed, the lateral stiffener defining buckling notches providing a predetermined lateral support between the inner and outer substrate portions; and
   a cover positioned over and vertically supported by the elastic bed proximate the aperture.

9. The vehicle armrest of claim 8, wherein the tunable lateral stiffener and the vertically supporting elastic bed are integrally formed portions of the interior reinforcement that defines a unitary member.

10. The vehicle armrest of claim 8, wherein the interior reinforcement includes engagement tabs that extend vertically into the inner and outer substrate portions, and wherein the inner and outer substrate portions include tab receptacles for receiving and retaining the engagement tabs.

11. The vehicle armrest of claim 8, wherein the elastic bed is made of unfilled polypropylene.

12. The vehicle armrest of claim 8, wherein the lateral stiffener is overmolded onto the inner and outer substrate portions.

13. The vehicle armrest of claim 8, wherein the armrest substrate includes an attachment portion having a plurality of protrusions that are received by an armrest receptacle defined within a frame of a vehicle door, and wherein the armrest receptacle includes a plurality of crumple portions that are at least partially defined by the buckling features.

14. The vehicle armrest of claim 8, wherein the stiffening feature is tuned by modifying the size of the aperture.

15. An armrest comprising:
   a tunable stiffening feature spanning over a gap defined between opposing armrest substrates and setting lateral positions of the opposing armrest substrates, the tunable stiffening feature having an aperture disposed within the gap; and
   a planar elastic cover extending over the aperture and providing vertical support to an armrest cover proximate the aperture, the planar elastic cover being free of resistance to lateral movement of the opposing armrest substrates.

16. The armrest of claim 15, wherein the tunable stiffening feature includes integrally formed engagement tabs that extend vertically into the opposing armrest substrates, and wherein each of the opposing armrest substrates includes tab receptacles for receiving and retaining the engagement tabs.

17. The armrest of claim 15, wherein the elastic cover is made of unfilled polypropylene.

18. The armrest of claim 15, wherein the tunable stiffening feature is overmolded onto the opposing armrest substrates.

19. The armrest of claim 15, wherein the opposing armrest substrates include inner and outer armrest substrate portions, wherein the outer armrest substrate portion includes an attachment portion having a plurality of protrusions that are received by an armrest receptacle defined within a frame of a vehicle door, and wherein the armrest receptacle includes a plurality of crumple portions.

20. The armrest of claim 15, wherein the tunable stiffening feature is tuned by at least one of modifying a size of the aperture and modifying a material thickness of the tunable stiffening feature.

* * * * *